United States Patent

Cupler, II

[15] 3,704,073

[45] Nov. 28, 1972

[54] VEE MACHINING CENTER

[72] Inventor: John A. Cupler, II, 10 Cupler Drive, Cumberland, Md. 21502

[22] Filed: Dec. 7, 1970

[21] Appl. No.: 95,678

[52] U.S. Cl. ..................408/1, 408/35, 408/128
[51] Int. Cl. ..................B23b 35/00, B23b 47/16
[58] Field of Search..................408/1, 35, 128

[56] References Cited

UNITED STATES PATENTS

| | | | |
|---|---|---|---|
| 2,607,244 | 8/1952 | Cupler | 408/128 |
| 2,764,967 | 10/1956 | Cupler | 408/1 X |
| 3,073,024 | 1/1963 | Hutchens et al. | 408/35 X |
| 3,371,558 | 3/1968 | Asmanes | 408/128 X |
| 3,570,330 | 3/1971 | Cupler | 408/1 |
| 3,598,495 | 8/1971 | Cupler | 408/35 |

*Primary Examiner*—Harrison L. Hinson
*Attorney*—Colton & Stone

[57] ABSTRACT

A Vee machining center employing two distinct non-captive tool retaining means which are, each, operable to retain a tool in substantially the same position as a function of the tool releasing movement of the other. One of the retaining means consists of the usual flexible drive belt for rotating the tool while the other comprises a mechanical gripper providing temporary support for the tool during tool interchange.

Two distinct, alternately usable power sources provide two distinct speed control ranges for the machining center.

15 Claims, 10 Drawing Figures

INVENTOR
JOHN A. CUPLER, II

BY Colton + Stone
ATTORNEYS.

INVENTOR
JOHN A. CUPLER, II

BY Colton + Stone

ATTORNEYS

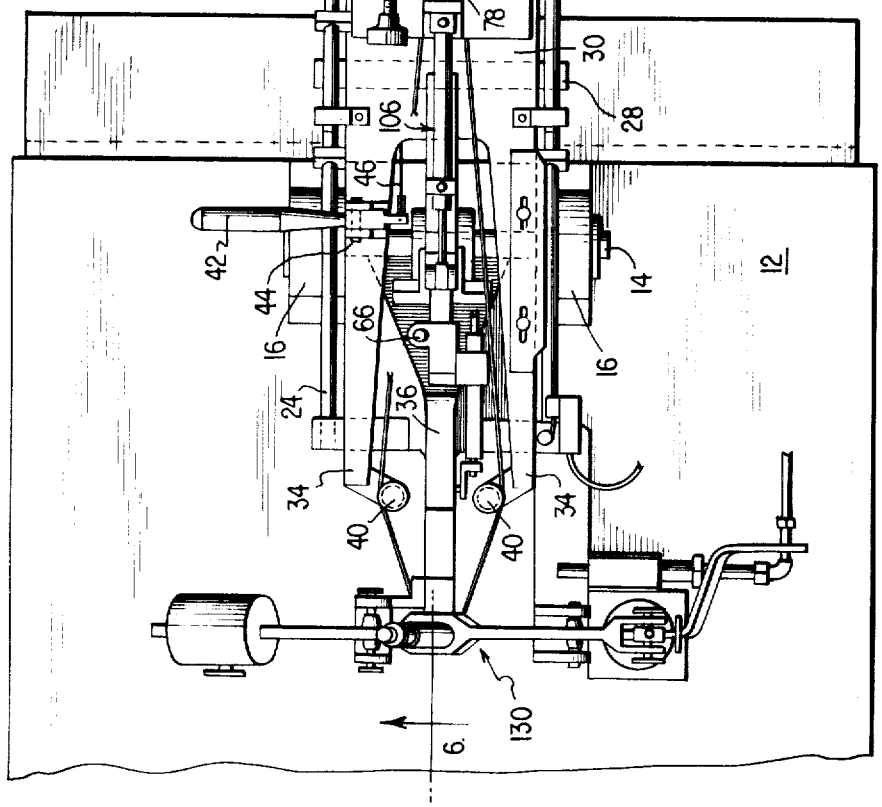
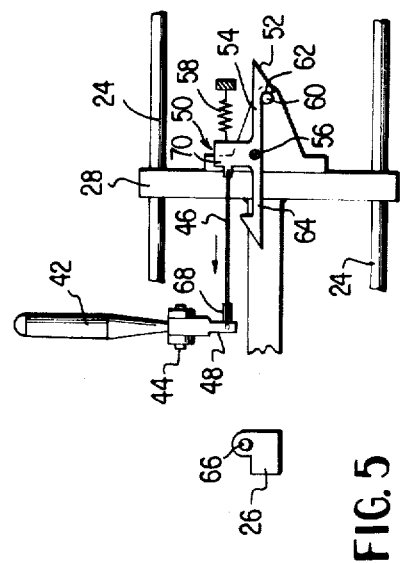

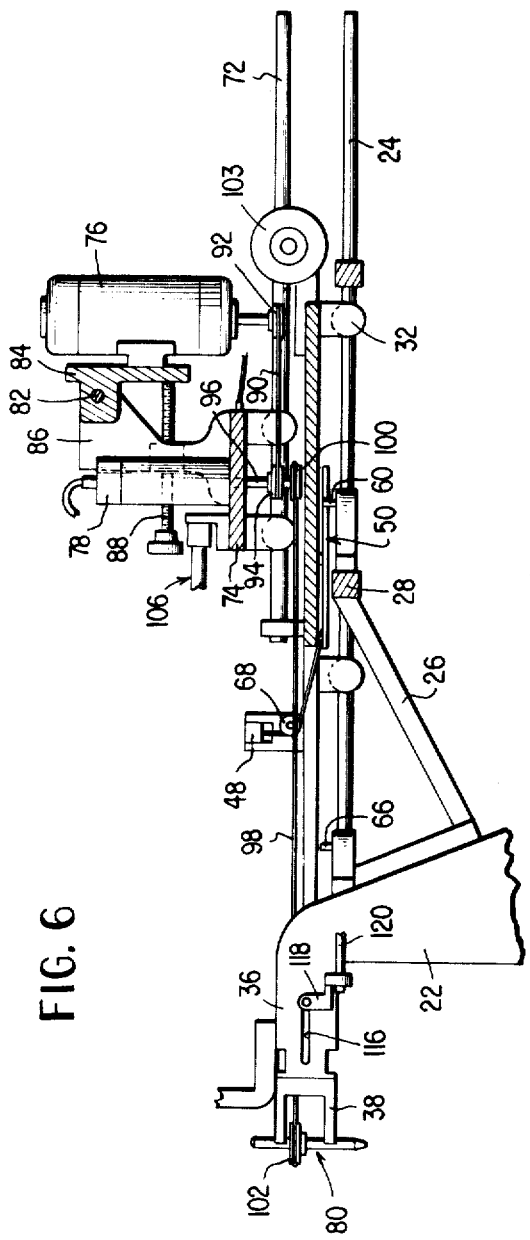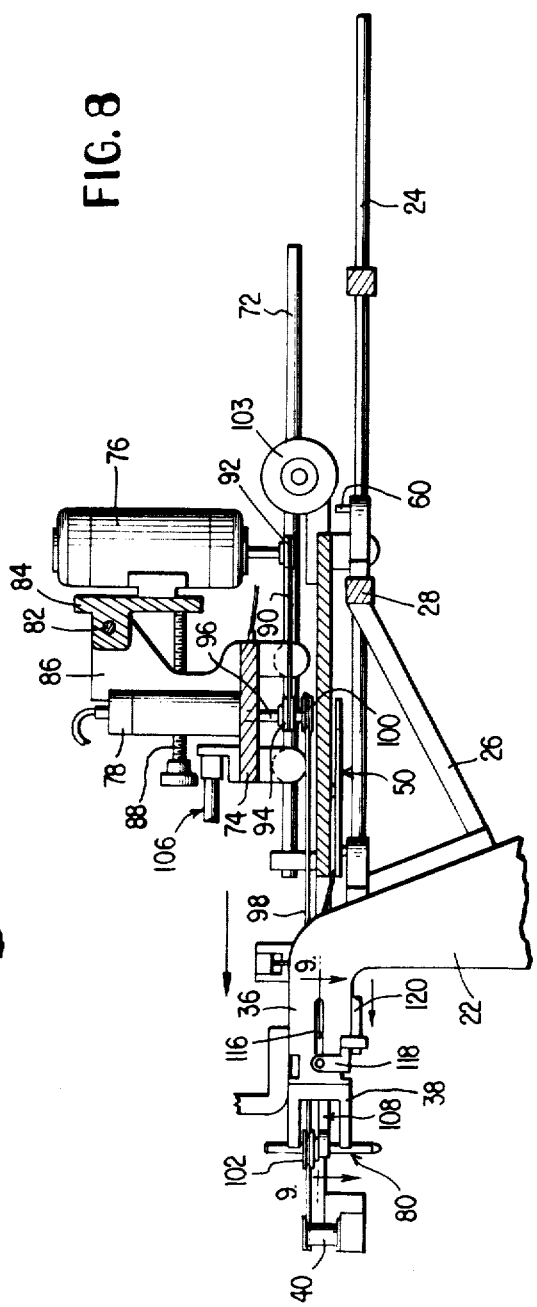

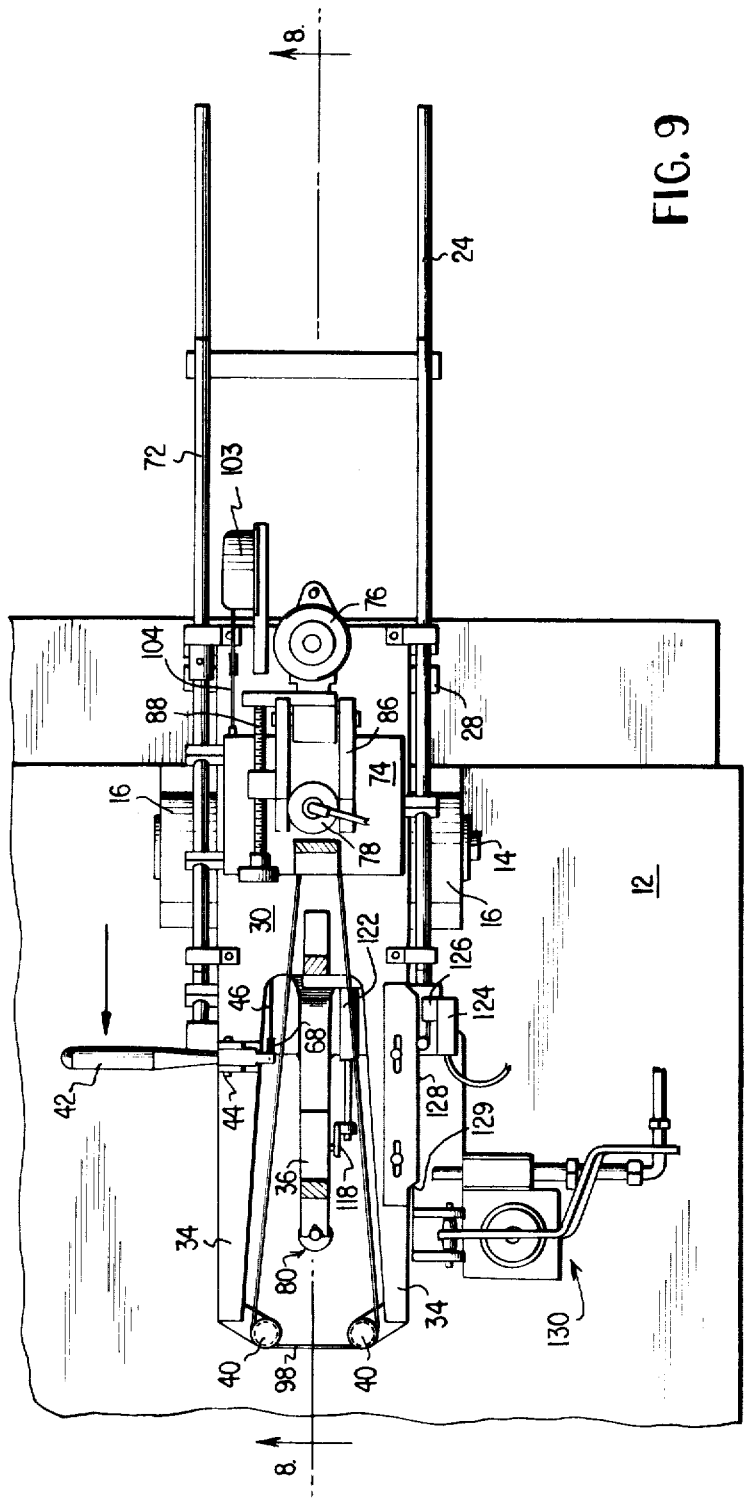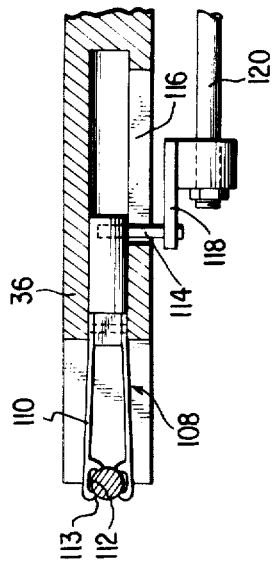

INVENTOR
JOHN A. CUPLER, II

BY Colton & Stone

ATTORNEYS.

3,704,073

VEE MACHINING CENTER

BACKGROUND OF THE INVENTION

Vee machining centers of the type shown in U.S. Pat. No. 2,607,244 to John A. Cupler, II, as well as those improved versions thereof manufactured by National Jet Company, Cumberland, Maryland under the model designations 2M, 3M and 7M have enjoyed substantial commercial success which is due, primarily, to the fact that those eccentricities of tool rotation inherent to all chucked machining tools are completely eliminated. Vee machining centers of this type employ open Vee bearings against which a non-captive tool, integral with its own spindle, is retained and rotated by the tension of a flexible drive belt. The tool may then be manually infed along its own axis, relative to its supporting Vee bearing, to effect a machining operation. Alternatively, the tool may be preprogrammed for automatic infeeding generally in accordance with the principles set out in U.S. Pat. No. 3,478,419.

While it is axiomatic that any machining center should provide for rapid tool exchange, whether for conventional replacement purposes or that tool interchange associated with the performance of multiple machining operations along a single centerline; it is particularly desirable in those instances of the latter type wherein the machining operation is economically impractical if not impossible in the absence of a rapid tool interchange capability. The technique known as Progressive Step Tool Change and described in applicant's copending application Ser. No. 786,344 filed Oct. 23, 1968, now U.S. Pat. No. 3,570,330, is exemplary.

In U.S. Pat. No. 2,607,244, which illustrates a tool drive system typical of the manually infed type, above referenced; a single motor provides the driving input to a flexible belt which rotates the tool through frictional engagement with a pulley integral with the tool. In order to exchange tools it is first necessary to stop the drive motor and then release the belt from driving engagement with the tool pulley which, unless an operator manually maintains tension on the belt while selecting and inserting another tool, results in the now slack belt slipping from the drive motor pulley. Even if belt tension be maintained manually, as by stretching the belt as a tool is removed; it is quite cumbersome and time consuming to insert another tool within the tensioned belt loop and on the Vee bearing with one hand while maintaining a stretched belt condition with the other. The usual situation is that slack develops and the belt becomes disengaged from the motor drive pulley after which time the tool may be positioned in the Vee bearing, the belt tensioned thereabout and the tension maintained as the belt is again slipped onto the motor drive pulley. This, too, is awkward and time consuming since the tool has a tendency to slip from the Vee bearing if one hand is not used to hold the tool in place leaving only one hand free to position the tensioned belt over the motor drive pulley. Such a cumbersome procedure may often require more than 60 seconds to exchange a tool, particularly if the belt becomes disengaged from the motor drive pulley necessitating the operator's movement to the rear of the machine to complete the reengagement of the belt with the motor drive pulley.

The typical variable speed motor used with the previously known Vee machining centers provides a sufficient speed range for most machining operations however there are some instances where much higher rotational speeds are desirable such as those which may be achieved with an air turbine. It is not considered practical to use an air turbine, alone, since its rotational speed cannot be as closely and accurately controlled as is that of an electric motor which is used for the great majority of the time. An air turbine does, however, provide the additional capability of a much higher speed range than can be achieved with the conventionally used electric motors.

SUMMARY OF THE INVENTION

In addition to the improvements set out in applicant's copending application Ser. No. 786,344 filed Oct. 23, 1968, now U.S. Pat. No. 3,570,330, the invention herein disclosed constitutes an improvement over the cited prior art primarily in the provision of a greatly reduced tool exchange time and dual, alternately usable power sources for rotating the tool.

The former is achieved by the use of mechanical means to perform the functions of maintaining belt tension and tool positionment on the Vee bearing during tool exchange which functions were previously performed by hand. More specifically, with a tool in working position, a recirculating flexible drive belt extends about a pair of idler spools or pulleys effecting less than a 90° wrap thereabout before passing on to extend about the tool drive pulley with an approximate 180° wrap. The idler spools are mounted on either side of the Vee bearing for reciprocal movement between a tool working position rearwardly of the bearing and a tool exchange position forwardly of the bearing. Upon movement of the idler spools to their forward position, the belt is removed from driving engagement with the tool and is moved forwardly thereof as the belt assumes a straight recirculating path of movement between the idler spools and is wrapped approximately 90° thereabout from whence the belt path passes rearwardly to the drive motor pulley. The drive motor and its driving pulley are also mounted for limited fore and aft movement to accommodate the forward movement of the idler spools to remove the belt from driving engagement with the tool. A mechanical gripper, which may be normally housed within the Vee bearing support structure, is automatically extended to releasably grip and support the previously driven tool in position on the bearing as a function of the forward movement of the idler spools. With the idler spools in their forwardmost position maintaining the belt in tension in spaced relation from the tool and the same being releasably supported by the gripper; it is a simple matter to remove the tool from the gripper and insert a new tool in its place. Following such exchange, the idler spools are again moved rearwardly to cause the drive belt to engage and press the tool against the Vee bearing concomitantly with the automatic withdrawal of the gripper. The drive belt continues to run during the entire exchange operation which represents a further substantial factor in reducing tool exchange time which, with the present invention, does not normally require more than 5 seconds.

The selectively usable power sources are mounted for limited reciprocal movement to accommodate the tool exchange operation just described. The forward-most power source, herein illustrated as an air turbine, includes two pulleys rigidly secured to the output shaft. One of the pulleys lies in the normal plane of recirculation defined by the tool engaging belt while the other is immediately adjacent thereto. A second power source herein illustrated as an electric motor has a single drive pulley affixed to its output shaft in substantial planar alignment with the other of the first source drive pulleys. A second flexible drive belt is tensioned between these latter two pulleys. The rearward source is mounted for limited pivotal movement relative to the forward source to control tension on the second belt. Thus, when the tool is being rotated by the rearward source, the second belt is tensioned to drive the output shaft of the deenergized forward source motor which, in turn, provides the recirculating input to the tool engaging belt. When the forward source is to be used, the rearward source is pivoted slightly to decrease the second belt tension to such an extent as to permit it to slip relative to its entrained pulleys as the tool engaging belt is driven by the energized forward source.

A control mechanism which may be either manually or automatically operated provides for the forward and rearward movement of the idler spools and the remaining mechanical movements involved in the tool exchange operation, including the reciprocal source mounting and the gripper, are automatically effected in response to the movement of the idler spools.

The entire machining center, except for the planar support structure in the nature of a work table, is pivotally mounted for rearward movement to completely clear the work table for any diverse work operations that may be required such as those specifically disclosed in the aforesaid copending application Ser. No. 786,344, filed Oct. 23, 1968, now U.S. Pat. No. 3,570,330.

DESCRIPTION OF THE DRAWINGS

FIG. 4 is a top plan view thereof;

FIG. 5 is a fragmentary detail view of the mechanism associated with a manual control lever for positioning and locking a shiftable base plate supporting the drive belt idler drums;

FIG. 6 is a sectional view taken along line 6—6 of FIG. 4;

FIG. 7 is a top plan view similar to FIG. 4 but illustrating the tool exchange position with the idler drums shifted forwardly and the recirculating drive belt spaced from the tool;

FIG. 8 is a sectional view taken along line 8—8 of FIG. 7;

FIG. 9 is a sectional view taken along line 9—9 of FIG. 8; and

DETAIL DESCRIPTION OF THE PREFERRED EMBODIMENT

Figure 1:
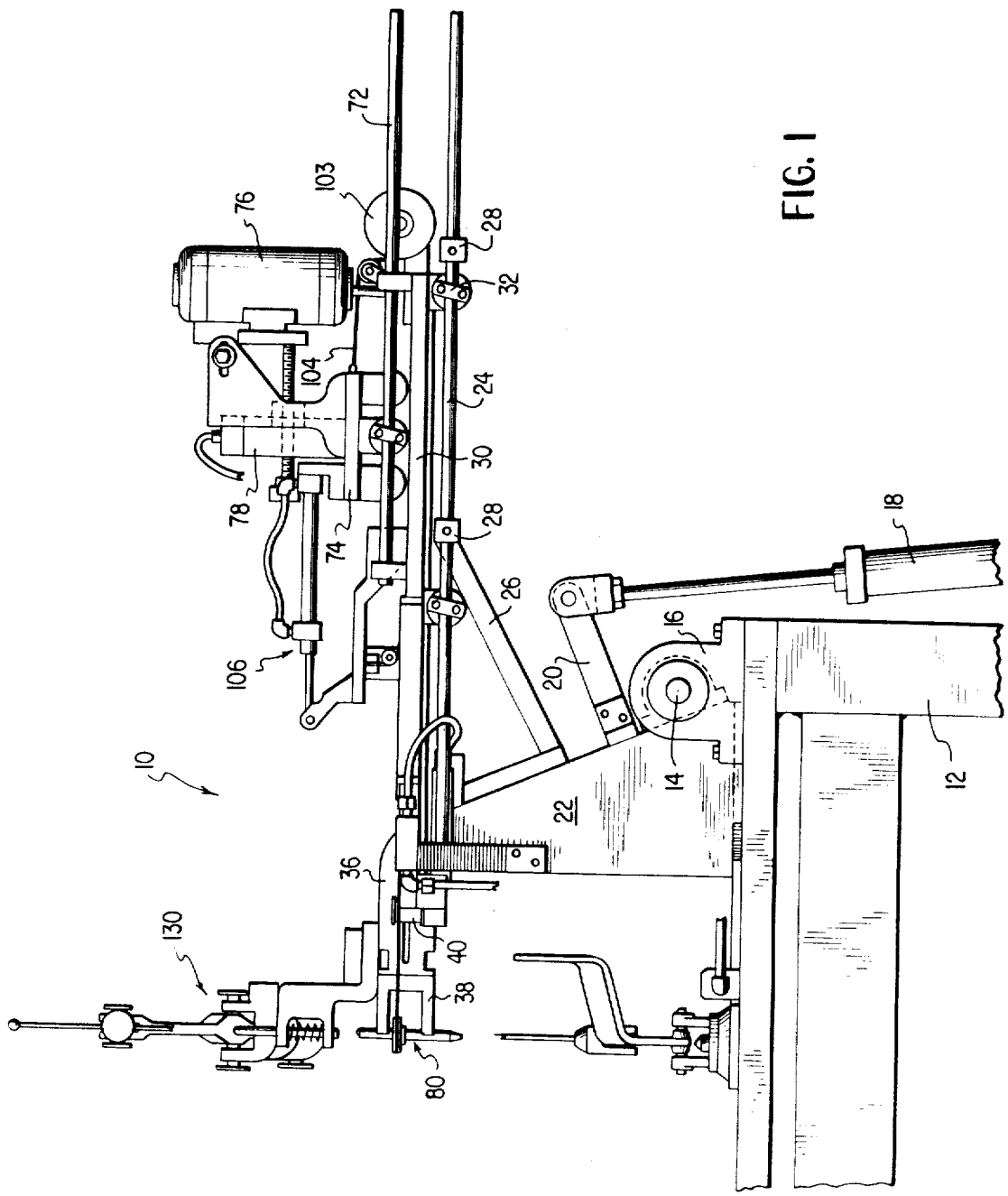
FIG. 1 is a side elevational view of a Vee machining center with parts broken away for clarity of illustration and a tool in working position with the drive belt trained thereabout through approximately 180°.
Figure 3:
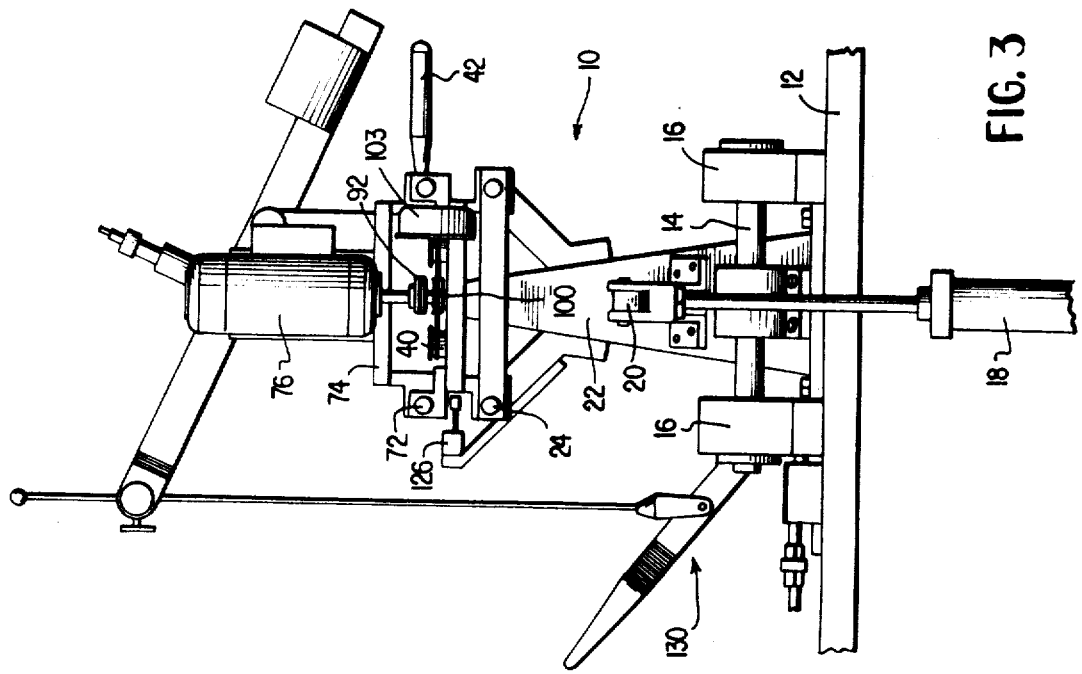
FIG. 3 is a rear elevational view thereof.
Figure 2:
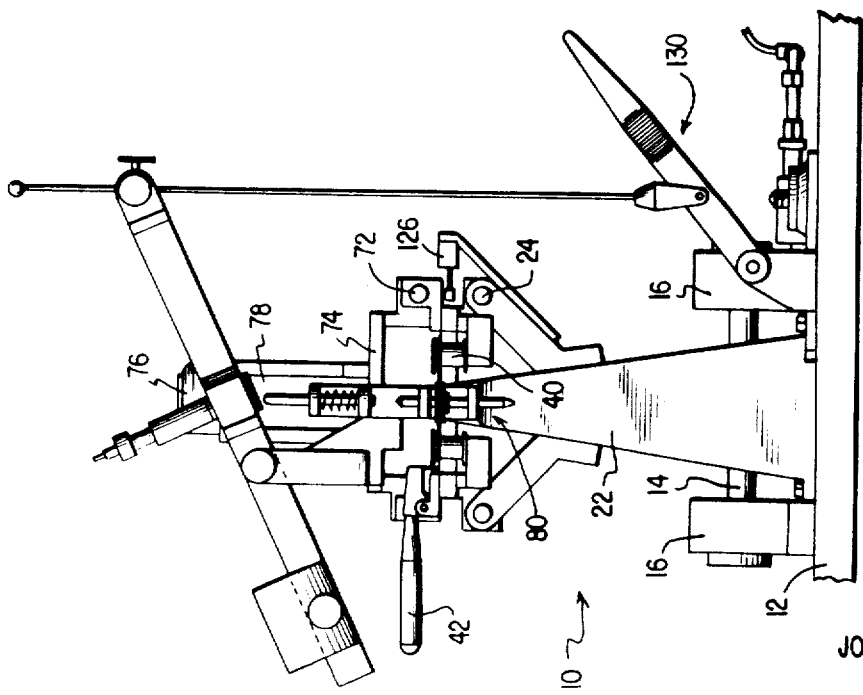
FIG. 2 is a front elevational view thereof.
Figure 10:
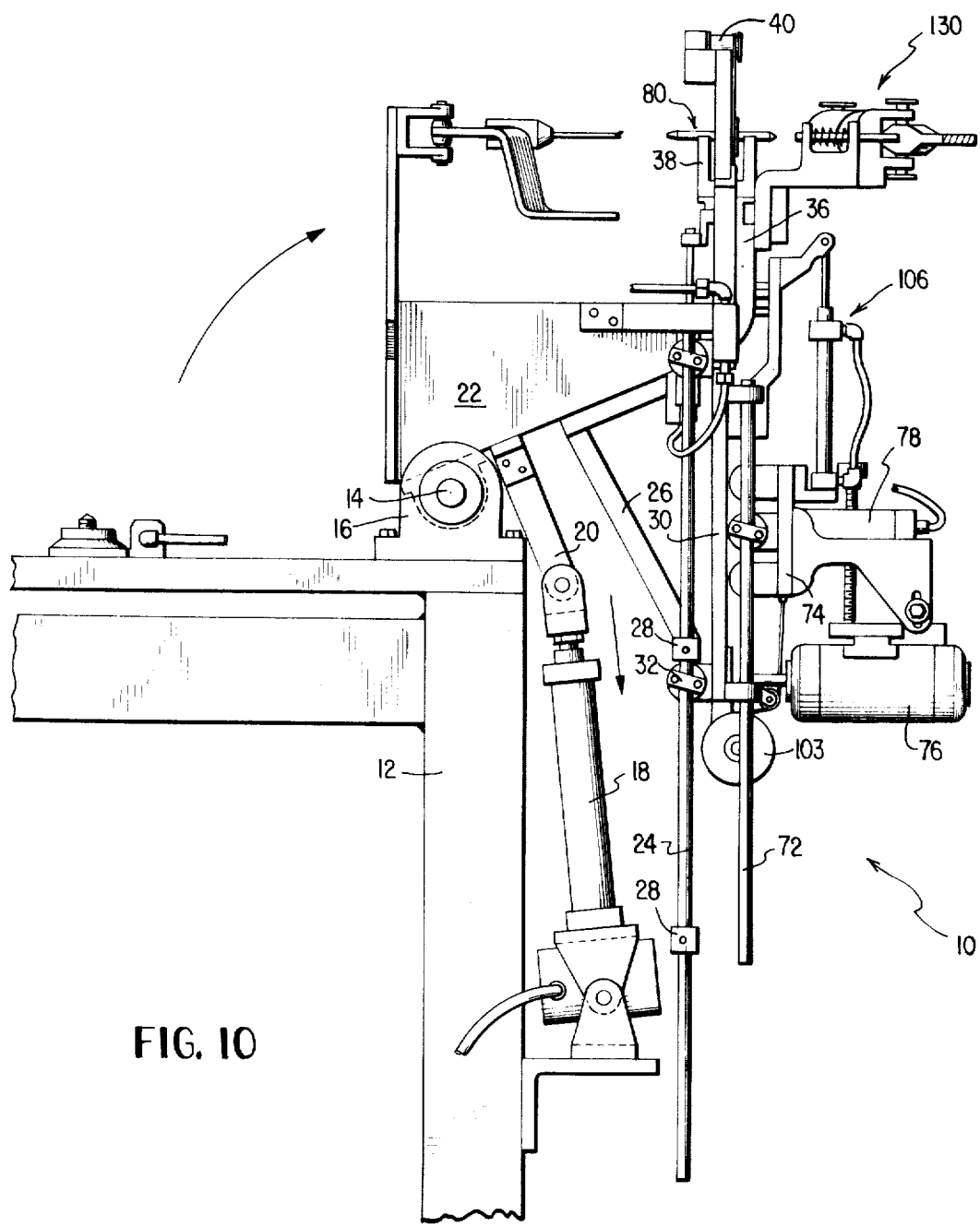
FIG. 10 is a side elevational view illustrating the manner in which the work table may be cleared for diverse operations.

The Vee machining center herein described as a drilling machine 10 is mounted on support table 12 for pivotal movement about the axis of shaft 14 between a working position overlying table 12 and a nonworking position displaced approximately 90° therefrom as shown in FIGS. 1 and 10, respectively. Shaft 14 is journalled in bearing blocks 16 rigidly mounted on the upper surface of table 12 and a conventional double acting air motor 18 interconnected between a lower portion of table 12 and a bracket 20 secured to base 22 of drilling machine 10 controls the selective movement of the drilling machine between the working and nonworking positions.

Slide bearing ways 24 are fixedly secured to base 22 as by support bracket 26 and cross bracing 28. A reciprocable, generally yoke shaped base plate 30 is mounted for reciprocal movement on ways 24 through the intermediary of conventional bearings 32. Yoke arms 34 extend forwardly on either side of an extended arm 36 integral with base 22 to which is rigidly secured a conventional Vee bearing 38. Idler spools 40 at the forward ends of yoke arms 34 are selectively positionable between the rearward tool working position shown in FIG. 1 and the forward tool exchanging position of FIG. 7 as the base plate 30 is selectively reciprocated along ways 24 by manipulation of handle 42. Handle 42 is mounted for limited pivotal movement about pivot pin 44 to tension a flexible control line 46 interconnected between one end 48 of the handle 42 and a generally T-shaped locking dog 50 which is automatically responsive to the full forward or rearward travel of base plate 30 on ways 24 to lock the same at either of the extreme positions shown, respectively, in FIGS. 1 and 7. A fragmentary illustration of the locking dog and the manner in which it is released by manipulation of handle 42 appears in FIG. 5 wherein it will be seen that cam surface 52 on arm 54 of locking dog 50 causes the same to undergo counter-clockwise rotation about pivot 56 securing the dog to the undersurface of base plate 30 against the bias of spring 58 as the rearward travel of the base plate causes cam surface 52 to engage locking pin 60 carried on cross bracing 28. Following the counter-clockwise camming movement of arm 54, as viewed in FIG. 5, the same is locked behind pin 60 as locking abutment 62 is returned to its original position by spring 58. The other arm of dog 50 is formed with an oppositely facing locking abutment which coacts with a similar locking pin 66 carried on support bracket 26. The locking dog may be released from either locked position by depressing the outer end of handle 42 to rotate dog 50 counter-clockwise about its pivot 56 in opposition to the bias of spring 58 as the upward movement of handle portion 48 is transmitted via control line 46 and a change direction idler 68 to the outer end of locking dog leg 70.

A set of slide bearing ways 72 are rigidly carried by base plate 30 and support thereon, for reciprocal movement relative to the base plate, a motor support bracket 74 on which is mounted a variable speed reversible electric motor 76 and an air turbine motor 78 for rotating a tool 80 in Vee bearing 38. Either of the motors 76, 78 may be utilized to rotate tool 80 in a manner that will become apparent from an inspection of FIGS. 6 and 8. Electric motor 76 is mounted for limited pivotal movement about pivot 82, interconnecting a motor mounting plate 84 and a pair of upstanding arms 86 integral with support bracket 74, under the opposed influences of a threaded adjusting screw 88 and a resilient drive belt 90 trained around electric motor drive pulley 92 and a pulley 94 secured to the air turbine motor output shaft 96. Turbine motor 78 is rigidly mounted on support bracket 74 and a second resilient drive belt 98 extends from a second pulley 100, secured to turbine shaft 96, about idler spools 40 at the forward ends of yoke arms 34 and, when base plate 30 is in its full rearward position, into driving engagement with a tool driving pulley 102 integral with tool 80.

Assuming that tool 80 has been rotated by the turbine motor and it is subsequently desired to rotate the tool at a relatively lower speed by electric motor 76, a suitable valve (not shown) is actuated to block compressed air flow to the turbine while leaving a return line open and adjusting screw 88 is manipulated to pivot electric motor 76 counter-clockwise as viewed in FIGS. 6 and 8, to tension belt 90. Electric motor 76 is then energized to rotate turbine shaft 96, which may now free-wheel, and its interconnected second pulley 100 to rotate tool 80 through belt 98. In order to reconvert to a turbine drive it is only necessary to adjust screw 88 to pivot electric motor 76 clockwise, as viewed in FIGS. 6 and 8, a slight amount until drive belt 90 is sufficiently slack to slip on pulley 92 and/or pulley 94. Thereafter, the turbine motor may be energized to rotate the tool.

Motor support bracket 74 is normally biased to a rearward position as shown in FIGS. 1, 4 and 6 by a housed, biased take-up spool 103, mounted on base plate 30, on which is wrapped a flexible cable 104 or the like whose free end is secured to motor support bracket 74. A conventional dashpot 106 interconnected between base plate 30 and motor support bracket 74 damps the reciprocal movement of support bracket 74.

In the tool exchange portion of the cycle, handle 40 is manipulated to release base plate 30 for forward travel and it will be seen that as idler spools 40 come abreast of tool 80 the belt holding restraint on the tool will be removed so that it would fall from the open Vee bearing 38. In order to preclude this occurrence, a separate mechanical tool holder is automatically activated to releasably grip the tool as a function of the forward movement of base plate 30. A tool holder 108 (FIG. 9) comprised of integral spring metal includes a pair of spring fingers 110 which are integrally joined at their rearward ends and have coacting cutouts at their forward ends which, together, form a spring socket 112 which will releasably grip the spindle of tool 80. Tool holder 108 is reciprocably housed within extended arm 36 for reciprocal movement between a first housed position within arm 36 and a second extended or tool holding position wherein spring socket 112 embraces the normal tool work axis defined by Vee bearing 38. Spring socket 112 is, of course, formed with a somewhat smaller unflexed diameter than the tool spindle diameter and is provided with the necessary cam faces 113 to insure that the socket will be expanded to embrace the tool as the same is moved forwardly relative to a tool supported on the Vee bearing. The manner in which this is accomplished will become apparent from an inspection of FIGS. 6–9. A pin 114 is secured to the rear end of tool holder 108 and extends through a slot 116 in arm 36. A collar (not shown) on the extended end of pin 114 is embraced by a yoke 118 which is secured to the piston rod 120 of a double acting reciprocal air motor 122 whose double action is controlled by a solenoid air valve 124 having an associated microswitch 126. The actuating arm of switch 126 is so positioned relative to a cam track 128 carried by base plate 30 that the same will be energized by engagement with inclined track face 129, as the base plate is moving forwardly, at a point in time before idler spools 40 release the holding tension applied by belt 98 to tool 80 (compare FIGS. 4 and 7). When the solenoid air valve is actuated by the forwardly moving base plate, piston 120 of air motor 122 is extended to drive tool holder 108 forwardly and grip tool 80 while the same is still held against Vee bearing 38 by the tension of belt 98. As the forward movement of the base plate continues to the tool change position of FIG. 7, the belt is removed from engagement with tool 80 and the same is then releasably held against Vee bearing 38 by tool holder 108 as illustrated in FIGS. 8 and 9. The tool may then be manually removed from the holder and a new tool snapped into position in socket 112. Thereafter, rearward movement of base plate 30 results in the engagement of the tool driving pulley 102 by belt 90 before microswitch 126 engages inclined track portion 129 of the now rearwardly moving cam track 128. As the same moves further rearwardly and microswitch 126 reaches track portion 129, air motor 122 is retracted to forcibly remove the tool holder from engagement with the tool and re-house the same within arm 36.

A conventional manual infeed mechanism 130 may be used to control tool infeed in the usual manner of Vee drilling machines as more clearly described in those technical bulletins published by National Jet Company, Cumberland, Maryland designated M2-269, M3-668 and M7-967 which relate, respectively, to the aforementioned M2, M3 and M7 Vee machining centers.

It is apparent that all of the aforementioned manually manipulable mechanical movements such as the actuation of lever 42, the reciprocation of base plate 32, the adjustment of lead screw 88 and the operation of infeed mechanism 130 may be automatically performed as by tape controlled stepping motors, for example.

I claim:

1. A machining center, comprising; an open bearing defining an axis of tool rotation; first means for releasably supporting a tool in said open bearing and rotating the same about said axis of tool rotation; second means for releasably supporting a tool in said open bearing substantially along said axis; means mounting each of said first and second means for movement relative to said bearing between a tool supporting position adjacent said axis and a tool releasing position spaced therefrom; and means responsive to the movement of one of said first and second means to one of said positions for moving the other of said first and second means to the other of said positions.

2. A machining center, comprising; an open bearing defining an axis of tool rotation; drive means for releasably supporting a tool in said open bearing and rotating the same about said axis of tool rotation; holding means for releasably supporting a tool in said open bearing substantially along said axis; support means mounting each of said drive and holding means for movement relative to said bearing between a tool supporting position adjacent said axis and a tool releasing position spaced therefrom; and actuating means responsive to the movement of one of said drive and holding means to one of said positions for moving the other of said drive and holding means to the other of said positions.

3. The machining center of claim 2 wherein said drive means includes rotary power means and a flexible recirculating member; said support means for said drive means including idler means for defining, with said rotary power means, a complete recirculating path of travel for said member in the tool releasing position and cooperating with a tool supported in said bearing to define said path of travel in the tool supporting position.

4. The machining center of claim 3 wherein said idler means includes an idler positioned on either side of a line extending through said axis of tool rotation and the rotary axis of said power means; whereby movement of said idlers to one side of said bearing remote from the power means maintains the recirculating member in said tool releasing position and movement of the idlers to the other side of the bearing maintains the recirculating member in said supporting position.

5. The machining center of claim 3 wherein said rotary power means comprise plural distinct prime movers; and means for selectively driving said recirculating member by either of said prime movers.

6. A machining center, comprising; a forwardly facing open bearing defining an axis of tool rotation; power means positioned rearwardly of said bearing; idler means defining, with said power means, at least a portion of a recirculating path of travel for a flexible tool drive member; means mounting said idler means for movement relative to said bearing between a first position defining a path of recirculating drive member travel adjacent said axis for supporting and rotating a tool within said open bearing and a second position defining a path of recirculating drive member travel remote from said axis whereby tools may be exchanged while maintaining tension in said member, and tool support means mounted on said machining center for supporting a tool substantially along said axis when said idler means are in said second position.

7. The machining center of claim 6 wherein said tool support means are mounted for movement toward and away from said axis; and means responsive to the movement of said idler means for moving said tool support means.

8. The machining center of claim 7 wherein said tool support means comprise a mechanical gripper including a tool receiving socket for embracing said axis in the tool support position thereof.

9. The machining center of claim 8 wherein the means for moving said mechanical gripper includes power means.

10. The machining center of claim 6 wherein said idler means are positioned behind said bearing in said first position and in front of said bearing in said second position.

11. The machining center of claim 10 wherein said idler means include a pair of idlers positioned one on either side of a line extending between said axis and said power means; and said pair of idlers, in said second position, defining a straight path of recirculating drive member travel therebetween.

12. A machining center, comprising; a forwardly facing open bearing defining an axis of tool rotation; power means positioned rearwardly of said bearing; a flexible drive transmitting member adapted for selective tensioned driving engagement between said power means and a tool positioned on said bearing; idler means engaging said flexible drive transmitting member; means mounting said idler means for movement between a first position rearwardly of said bearing effecting driving engagement between said flexible drive member and a tool supported thereby on said axis and a second position maintaining said member in spaced relation to said bearing for disconnecting said driving engagement; auxiliary tool support means mounted on said machining center for movement into and out of tool supporting position; and means responsive to the movement of said idler means for moving said auxiliary tool support means.

13. The machining center of claim 12 including second power means; and means for driving said flexible drive transmitting member by either of said power means.

14. A machining center, comprising; a forwardly facing open bearing defining an axis of tool rotation; a resilient, flexible drive transmitting member; rotary means for defining a first path of recirculating travel for said member passing adjacent said axis; said means including rotary power means positioned rearwardly of said bearing, a rotary tool positioned within said bearing and idler means positioned laterally of a line joining said axis and said rotary power means; means mounting said idler means for movement relative to said bearing to define a second path of recirculating travel for said member spaced from said axis; said second path of travel being defined by said rotary power means and said idler means; auxiliary means for supporting said tool substantially along said axis; and means for extending said auxiliary means to support said tool as a function of the movement of said idler means to define said second path of traVel.

15. A method of rotating and changing tools, comprising; positioning a tool within a first mechanical tool support adjacent an open bearing, simultaneously moving a second mechanical tool support comprising a flexible drive member into driving engagement with said tool and withdrawing said first mechanical support, rotating said tool about the axis thereof; and simultaneously engaging said tool with said first support and withdrawing said second support.

* * * * *